United States Patent
Veale et al.

(10) Patent No.: US 11,436,043 B2
(45) Date of Patent: Sep. 6, 2022

(54) OPERATING SYSTEM CODE PATCHING DURING LIVE MIGRATION

(71) Applicant: International Business Machines Corporation, Armonk, NY (US)

(72) Inventors: Brian Frank Veale, Cedar Park, TX (US); Juan M. Casas, Jr., Round Rock, TX (US); Caleb Russell Olson, Austin, TX (US); Amanda Liem, Travis, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 16/682,820

(22) Filed: Nov. 13, 2019

(65) Prior Publication Data

US 2021/0141664 A1    May 13, 2021

(51) Int. Cl.
G06F 9/54    (2006.01)
G06F 9/48    (2006.01)
G06F 8/658    (2018.01)

(52) U.S. Cl.
CPC .......... *G06F 9/4856* (2013.01); *G06F 8/658* (2018.02); *G06F 9/542* (2013.01); *G06F 9/546* (2013.01)

(58) Field of Classification Search
CPC .... G06F 9/4843; G06F 9/4881; G06F 9/5077; G06F 9/54; G06F 9/546
USPC ..................... 718/1, 102; 719/313
See application file for complete search history.

(56) References Cited

U.S. PATENT DOCUMENTS

| | | | |
|---|---|---|---|
| 5,384,906 A | 1/1995 | Horst | |
| 5,903,730 A | 5/1999 | Asai et al. | |
| 6,226,734 B1 * | 5/2001 | Kleinsorge | G06F 9/5077 |
| | | | 712/13 |
| 7,617,488 B2 | 11/2009 | Srinivasan et al. | |
| 7,725,296 B1 | 5/2010 | Becker | |
| 7,870,406 B2 | 1/2011 | Arndt et al. | |
| 8,145,820 B2 * | 3/2012 | Tanaka | G06F 9/4856 |
| | | | 710/267 |
| 8,230,440 B2 | 7/2012 | Genden et al. | |
| 8,875,129 B2 | 10/2014 | Wagner et al. | |

(Continued)

FOREIGN PATENT DOCUMENTS

| | | |
|---|---|---|
| CN | 103812823 A | 5/2014 |
| CN | 107291527 A | 10/2017 |

(Continued)

OTHER PUBLICATIONS

International Searching Authority, PCT/IB2020/060564, dated Feb. 23, 2021.

(Continued)

*Primary Examiner* — Andy Ho
(74) *Attorney, Agent, or Firm* — Garg Law Firm, PLLC; Rakesh Garg; Nathan Rau

(57) ABSTRACT

For a process of an operating system, it is detected that a live migration has occurred, the live migration comprising a change in a hardware characteristic of a computer system on which the process executes. A first message is broadcast to a set of processors, the first message causing each processor in the set of processors to enter a waiting state. While each of the set of processors is in the waiting state, a portion of a set of program instructions of the operating system is modified.

20 Claims, 7 Drawing Sheets

(56) References Cited

U.S. PATENT DOCUMENTS

| | | | |
|---|---|---|---|
| 9,003,417 | B2 | 4/2015 | Armstrong et al. |
| 9,438,648 | B2 | 9/2016 | Asenjo et al. |
| 9,729,660 | B2 | 8/2017 | Venkatesan et al. |
| 9,792,150 | B1 | 10/2017 | Rangari et al. |
| 9,928,099 | B1* | 3/2018 | Surani ................ H04L 41/0869 |
| 10,860,367 | B2* | 12/2020 | Mani ..................... G06F 9/4856 |
| 2006/0153188 | A1* | 7/2006 | Doi ....................... G06F 9/4862 370/389 |
| 2006/0225079 | A1 | 10/2006 | Nayak et al. |
| 2010/0205252 | A1 | 8/2010 | Dorai et al. |
| 2016/0139944 | A1* | 5/2016 | Rouwet ............... G06F 9/45558 718/1 |
| 2018/0139272 | A1 | 5/2018 | Puri et al. |
| 2018/0329646 | A1 | 11/2018 | Dai et al. |

FOREIGN PATENT DOCUMENTS

| | | |
|---|---|---|
| CN | 108351802 A | 7/2018 |
| CN | 109710386 A | 5/2019 |
| WO | 2011057874 A2 | 5/2011 |
| WO | 2016041521 A1 | 3/2016 |

OTHER PUBLICATIONS

International Searching Authority, PCT/IB2020/060565, dated Feb. 23, 2021.
Nelson et al., Fast Transparent Migration for Virtual Machines, USENIX Association, 2005 USENIX Annual Technical Conference, 2005.
Lu et al., HSG-LM: Hybrid-Copy Speculative Guest OS Live Migration without Hypervisor, 2013.
Jo et al., A Machine Learning Approach to Live Migration Modeling, In Proceedings of SoCC '17, Santa Clara, CA, USA, Sep. 24, 27, 2017, 14 pages, https://doi.org/10.1145/3127479.3129262.
Raghunath et al., Virtual Machine Migration Triggering using Application Workload Prediction, Eleventh International Multi-Conference on Information Processing-2015 (IMCIP-2015), Procedia Computer Science 54, pp. 167-176, 2015.
List of all Related IBM Dockets. Appendix P. 2019.

* cited by examiner

OPERATING SYSTEM CODE PATCHING DURING LIVE MIGRATION

TECHNICAL FIELD

The present invention relates generally to a method, system, and computer program product for performing live migration of a virtual machine. More particularly, the present invention relates to a method, system, and computer program product for operating system code patching during live migration.

BACKGROUND

A virtual machine (VM) is an emulation of a physical computer system. A hypervisor is computer software that creates and manages VMs. A physical computer system on which a hypervisor manages one or more VMs is also called a host machine, and each VM is also called a guest machine. Using VMs allows multiple, different operating systems (OSs) to share the same set of physical hardware, as each OS can execute in its own VM.

To adapt to changing hardware resource availability and computing needs, VMs must be migrated from one physical machine to another. Live migration is the process of moving a running virtual machine (VM), including memory, storage, and network configurations, to a different physical machine without restarting an operating system or applications that may be executing on the migrating VM and while minimizing a time interval in which the VM is stopped for the migration.

SUMMARY

The illustrative embodiments provide a method, system, and computer program product. An embodiment includes a method that detects, for a process of an operating system, that a live migration has occurred, the live migration comprising a change in a hardware characteristic of a computer system on which the process executes. An embodiment broadcasts, to a set of processors, a first message, the first message causing each processor in the set of processors to enter a waiting state. An embodiment modifies, while each of the set of processors is in the waiting state, a portion of a set of program instructions of the operating system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
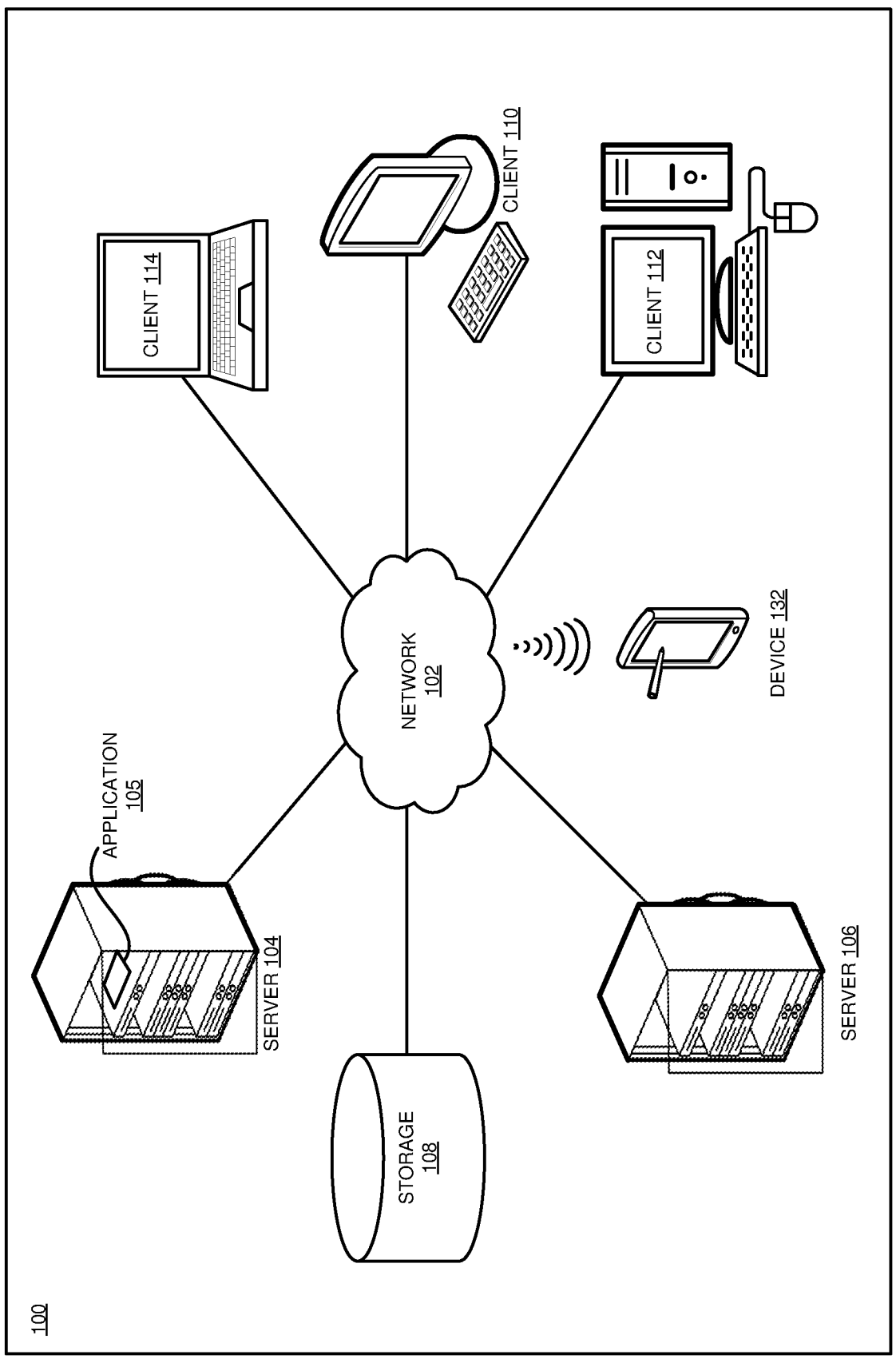
FIG. 1 depicts a block diagram of a network of data processing systems in which illustrative embodiments may be implemented.

The illustrative embodiments recognize that, when live migrating a VM and its operating system from one physical machine to another, there may be hardware differences between the source physical machine and the destination physical machine. In one non-limiting example of such hardware differences, although processors in the source and destination machines are of the same family and can execute the same operating system and application code without recompilation, the processors may be of different versions. For example, the source machine might have a Power 8 processor while the destination might have a Power 9 processor, or the source and destination machines might have different processors in the x86 processor family. In another non-limiting example of such hardware differences, the number of sockets, chips, or cores in the system might have changed, indicating that a VM migration has occurred. A third non-limiting example involves a system's non-uniform memory access (NUMA) topology, which specifies a grouping of processors according to memory access speed and informs the OS of which processors are located near the same memory so that workloads can be grouped together to take advantage of memory locality. Some changes in the NUMA topology (e.g. the generation count) also indicate that a VM migration has occurred.

The illustrative embodiments also recognize that, in some cases, operating system modification is required for correct functionality when performing a live migration between physical machines with a different hardware characteristic. As one non-limiting example, different versions of Power processors perform accounting and reporting of processor time consumed by processes differently. For example, while Power 8 and Power 9 processors both use the Process Utilization Resource Register to perform process accounting, Power 8 processors report a scaled PURR value for each thread based on how much actual run-time the thread received on the processor in a time period, and some Power 9 processors report a PURR value comprising actual time elapsed for each running thread, without scaling. Consequently, if a VM on a host with Power 8 processors is live migrated to a host with Power 9 processors and the operating system reads PURR values to determine process accounting, the PURR values will be incorrectly scaled, resulting in incorrect results. Incorrect results will also occur if a VM on a host with Power 9 processors is live migrated to a host with Power 8 processors. Consequently, the illustrative embodiments recognize that there is an unmet need to correct for different hardware characteristics during live migration.

The illustrative embodiments recognize that the presently available tools or solutions do not address these needs or provide adequate solutions for these needs. The illustrative embodiments used to describe the invention generally address and solve the above-described problems and other problems related to operating system code patching during live migration.

An embodiment can be implemented as a software application. The application implementing an embodiment can be configured as a modification of an existing live migration or operating system, as a separate application that operates in conjunction with an existing live migration or operating system, a standalone application, or some combination thereof.

Particularly, some illustrative embodiments provide a method that, for a process of an operating system, detects that a live migration including a change in a hardware characteristic of a computer system on which the process executes has occurred. While all other processors in the system are in a waiting state, the method modifies a portion of the operating system to account for the change in the hardware characteristic.

A kernel of an operating system is software that provides OS services, such as starting, stopping, and managing execution processes or threads, managing subsystems such as memory and storage, and providing services to user applications executing on the OS. A kernel process is a process that executes as part of the OS kernel, and has trusted access to portions of the system on which the OS executes. When the OS executes on a physical machine, a kernel process has access to physical system hardware. When the OS executes on a virtual machine, a kernel process has access to a virtual, or emulated, version of physical system hardware. A user-level, or user, process is a process of the OS that is not a kernel process.

An embodiment detects that a change in a hardware characteristic of a computer system on which a process executes has occurred. In other words, a live migration has occurred, and the embodiment is now executing on a different host. One embodiment executes as a kernel process of the operating system. Another embodiment executes as a user-level process of the operating system. An embodiment also determines that, due to the change in the hardware characteristic, a portion of operating system code must be modified to account for the change in the hardware characteristic. For example, the live migration might have been from a Power 8 system to a Power 9 system, or vice versa, and consequently the OS's process accounting must be modified to support the current processors' handling of PURR values.

An embodiment broadcasts a message to all other processors installed in the migrated system. Within a message handler at a receiving processor, the receiving processor acknowledges the message and loops, waiting for a second message. Thus, while awaiting the second message, a receiving processor is in a waiting state, does not execute user processes, and thus is prevented from accessing other portions of operating system that might be about to be modified.

An embodiment waits for other processors installed in the migrated system to acknowledge the broadcast message. A processor's acknowledgement indicates that the processor is in the waiting state and prevented from accessing other portions of operating system that might be about to be modified.

Once all the messaged processors have been placed in the waiting state, it is safe for an embodiment to modify code of the operating system, and an embodiment modifies code of the operating system to account for the change in the hardware characteristic. For example, if the live migration might have been from a Power 8 system to a Power 9 system, or vice versa, program instructions of the operating system that perform process accounting are modified to support the current processors' handling of PURR values.

Once the OS modification has been made, an embodiment broadcasts a second message to the processors in the waiting state. Within a message handler at a receiving processor that is waiting for this second message, the message handler receives the second message and exits the message handler process and hence the waiting state. Now the receiving processor is in normal operation, and the operating system has been modified to account for the live migration's change in the hardware characteristic.

The manner of operating system code patching during live migration described herein is unavailable in the presently available methods in the technological field of endeavor pertaining to virtual machine implementation. A method of an embodiment described herein, when implemented to execute on a device or data processing system, comprises substantial advancement of the functionality of that device or data processing system in detecting that a live migration including a change in a hardware characteristic of a computer system on which a process executes has occurred. While other processors in the system are in a waiting state, the method modifies a portion of the operating system to account for the change in the hardware characteristic.

The illustrative embodiments are described with respect to certain types of migrations, processes, kernels, message handlers, messages, modifications, hardware characteristics, process accountings, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
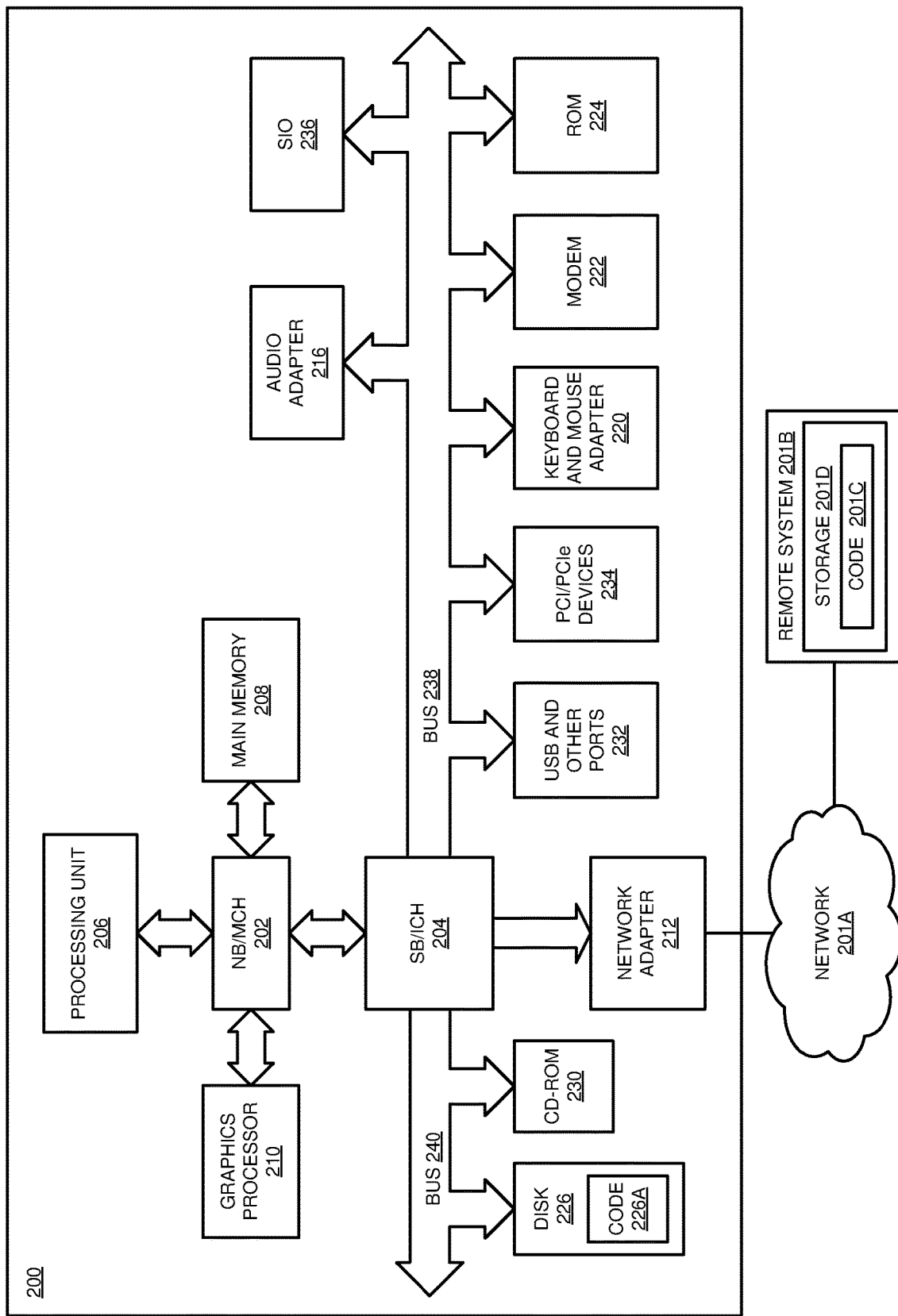
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 modifies operating system code during a live migration from one system to another, for example from server 104 to server 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
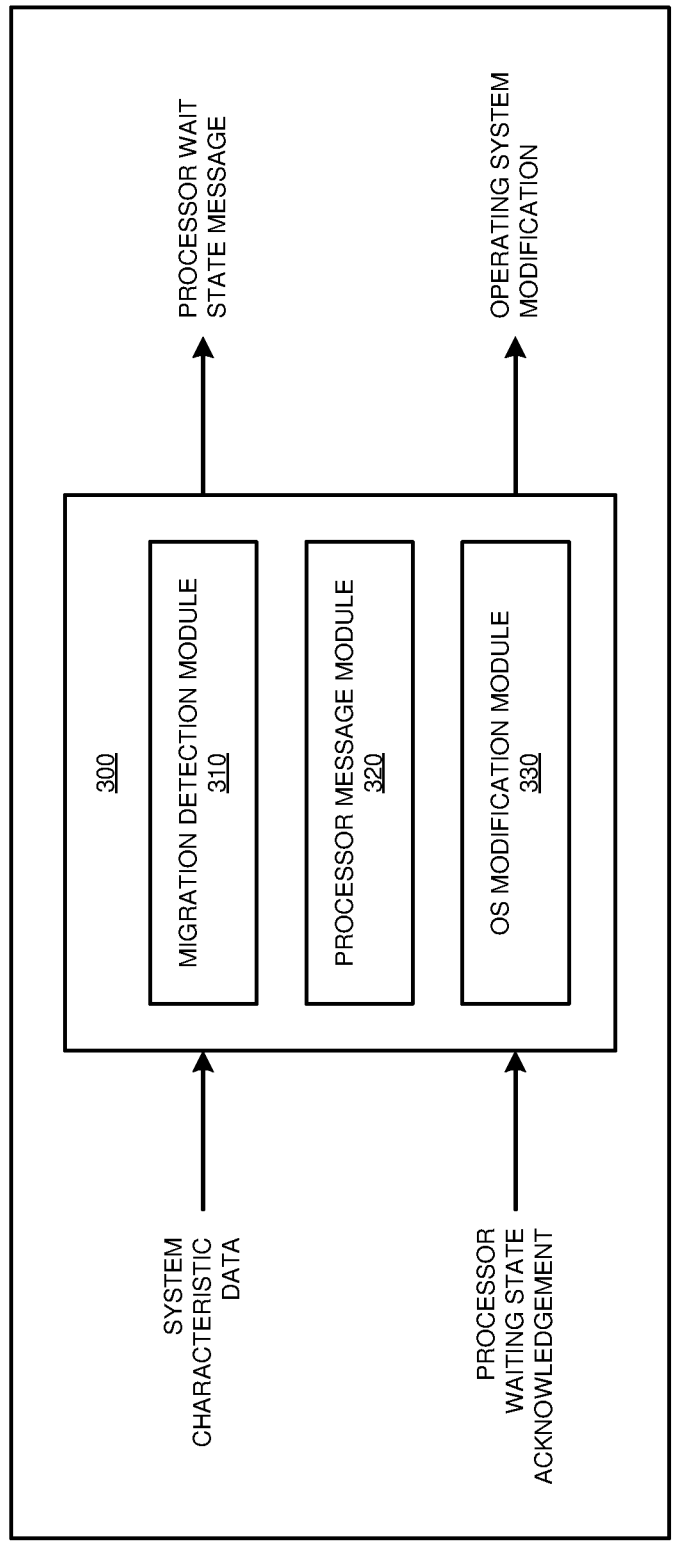
FIG. 3 depicts a block diagram of an example configuration for operating system code patching during live migration in accordance with an illustrative embodiment.

With reference to FIG. 3, this figure depicts a block diagram of an example configuration for operating system code patching during live migration in accordance with an illustrative embodiment. Application 300 is an example of application 105 in FIG. 1 and executes in any of servers 104 and 106, clients 110, 112, and 114, and device 132 in FIG. 1.

Application 300 executes as a kernel or user-level process within an operating system. Migration detection module 310 detects that a change in a hardware characteristic of a computer system on which the process executes has occurred. In other words, a live migration has occurred, and application 300 is now executing on a different host. Migration detection module 310 also determines that, due to the change in the hardware characteristic, a portion of operating system code must be modified to account for the change in the hardware characteristic.

Processor message module 320 broadcasts a message to one or more other processors installed in the migrated system, putting receiving processors into a waiting state. After the broadcast, processor message module 320 waits for other processors installed in the migrated system to acknowledge the broadcast message. A processor's acknowledgement indicates that the processor is in the waiting state and prevented from accessing other portions of operating system that might be about to be modified.

Once all the messaged processors have been placed in the waiting state, it is safe for application 300 to modify code of the operating system, and OS modification module 330 modifies code of the operating system to account for the change in the hardware characteristic. Once the OS modification has been made, processor message module 320 broadcasts a second message to the processors in the waiting state, returning receiving processors to normal operation.

Figure 4:
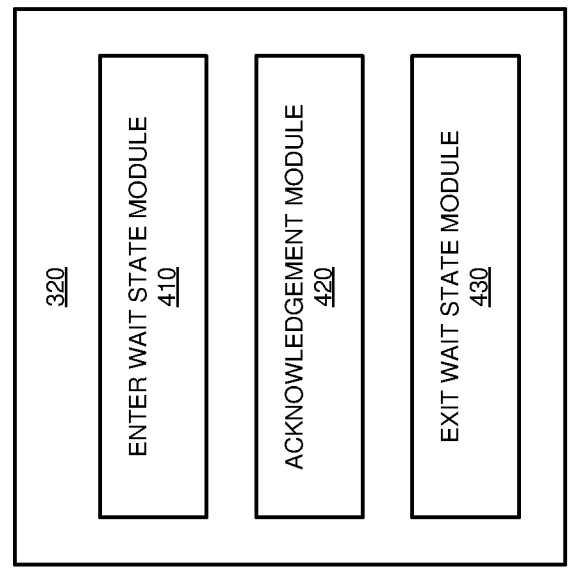
FIG. 4 depicts a block diagram of an example configuration for operating system code patching during live migration in accordance with an illustrative embodiment.

With reference to FIG. 4, this figure depicts a block diagram of an example configuration for operating system code patching during live migration in accordance with an illustrative embodiment. In particular, FIG. 4 depicts more detail of module 320 in FIG. 3.

Enter wait state module 410 broadcasts a message to one or more other processors installed in the migrated system, putting receiving processors into a waiting state. After the broadcast, acknowledgment module 420 waits for other processors installed in the migrated system to acknowledge the broadcast message. A processor's acknowledgement indicates that the processor is in the waiting state and prevented from accessing other portions of operating system that might be about to be modified. Then, to return receiving processors to normal operation, exit wait state message module 430 broadcasts a second message to the processors in the waiting state.

Figure 5:
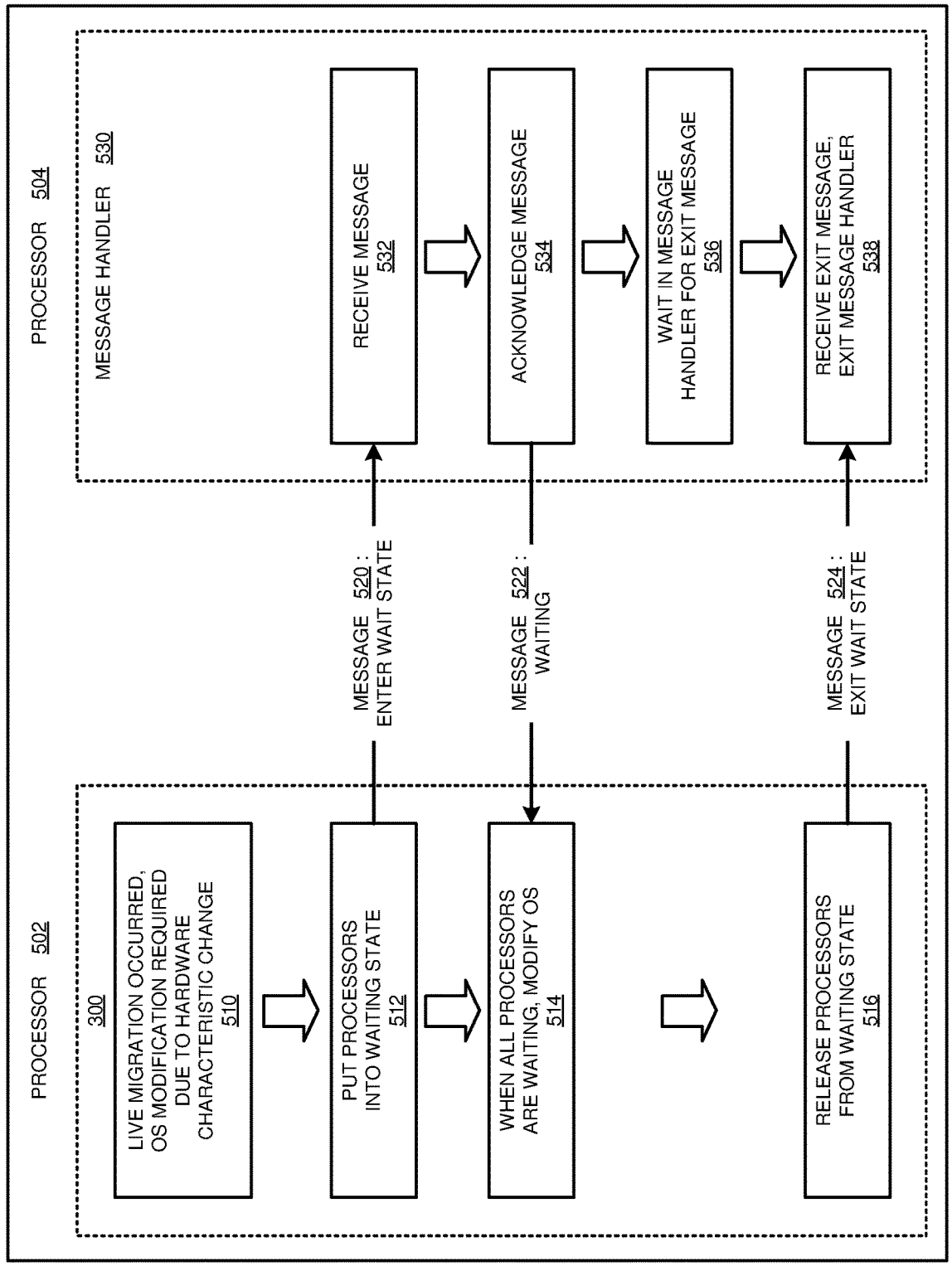
FIG. 5 depicts an example timing diagram of message flows during operating system code patching during live migration in accordance with an illustrative embodiment.

With reference to FIG. 5, this figure depicts an example timing diagram of message flows during operating system code patching during live migration in accordance with an illustrative embodiment. Application 300 is the same as application 300 in FIG. 3.

Application 300 is a process executing in processor 502. In state 510, application 300 determines that a live migration has occurred, and due to a change in the hardware characteristic, a portion of operating system code must be modified. In state 512, application 300 begins to put all other processors in the live migrated system into a waiting state, by broadcasting message 520 to other processors. Alternatively, application 300 sends a separate version of message 520 to each other processor that is to be put into a waiting state. Message 520 is received by message handler 530 executing in processor 504. Processor 504 is an example of the set of other processors to be put into a waiting state. In particular, in state 532 message handler 530 receives message 520, and in state 534 message handler 530 sends message 522, an acknowledgement, back to application 300. Next, in state 536, message handler 530 waits for a second message. In state 514, application 300 receives message 522 and, once all processors have acknowledged message 520, modifies code of the operating system to account for the change in the hardware characteristic. Then, in state 516, application 300 broadcasts message 524 to processor 504, where message handler 530 is waiting in state 536. Message handler 530 receives message 524 and proceeds to state 536, in which message handler 530 exits the message handler, returning processor 504 to normal operation. This example is not intended to be limiting. In particular, intervening messages may occur between messages 520 and 522, and between messages 522 and 524. As well, if message 522 is not sent, or is sent but not successfully received, application 300 is configurable to include an error-handling sequence (not shown) that resends message 520 or aborts the operating system modification process without sending message 524. In addition, the error-handling sequence is performable on a per-processor basis or for every processor that was originally sent message 520.

Figure 6:
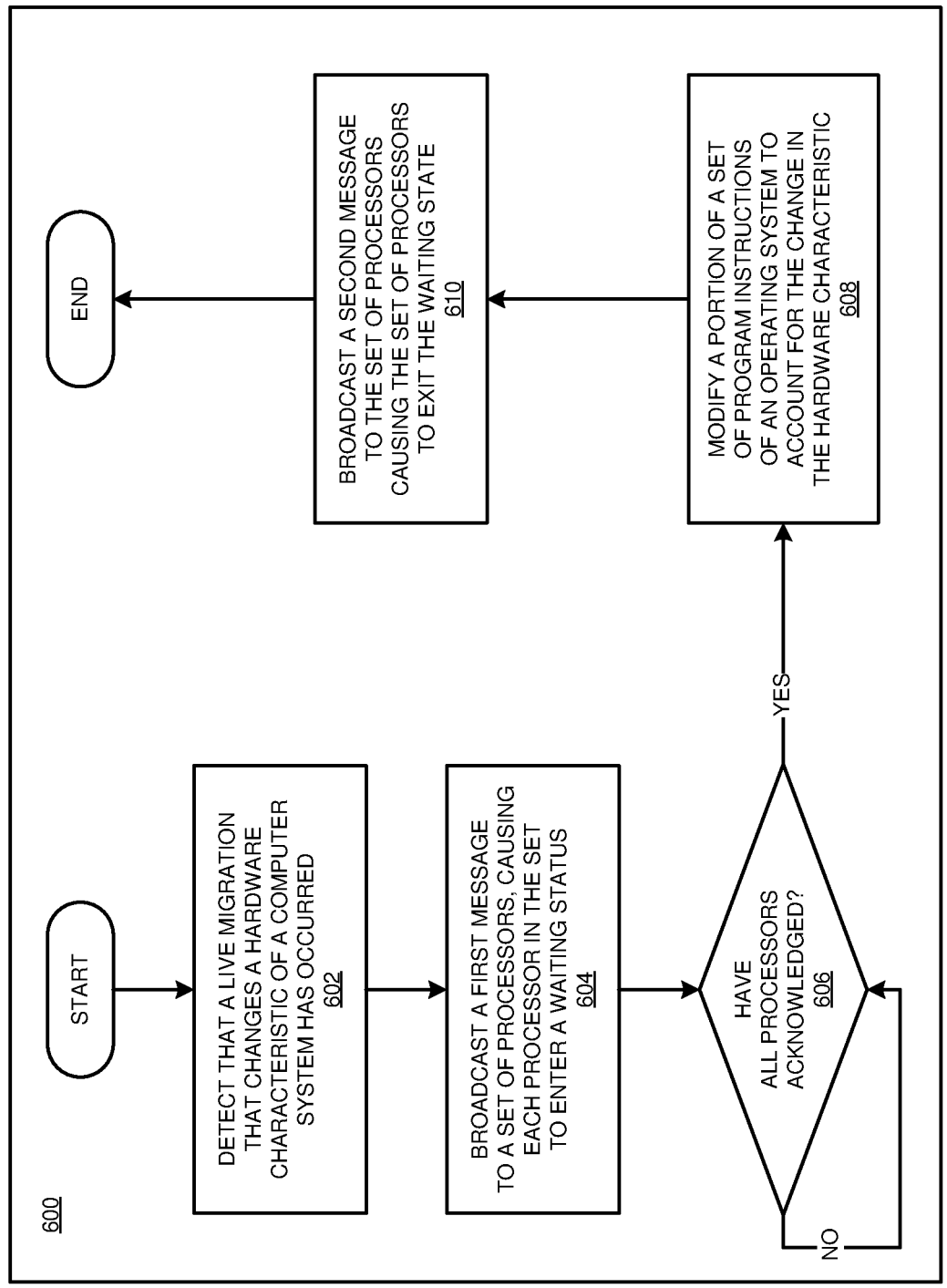
FIG. 6 depicts a flowchart of an example process for operating system code patching during live migration in accordance with an illustrative embodiment.

With reference to FIG. 6, this figure depicts a flowchart of an example process for operating system code patching during live migration in accordance with an illustrative embodiment. Process 600 can be implemented in application 300 in FIG. 3 or FIG. 5.

In block 602, the application detects that a live migration that changes a hardware characteristic of a computer system has occurred. In block 604, the application broadcasts a first message to a set of processors, causing each processor in the set to enter a waiting state. In block 606, the application waits until all processors have acknowledged the first message. In block 608, the application modifies a portion of a set of program instructions of an operating system to account for the change in the hardware characteristic. In block 610, the application broadcasts a second message to the set of processors causing the set of processors to exit the waiting state. Then the application ends.

Figure 7:
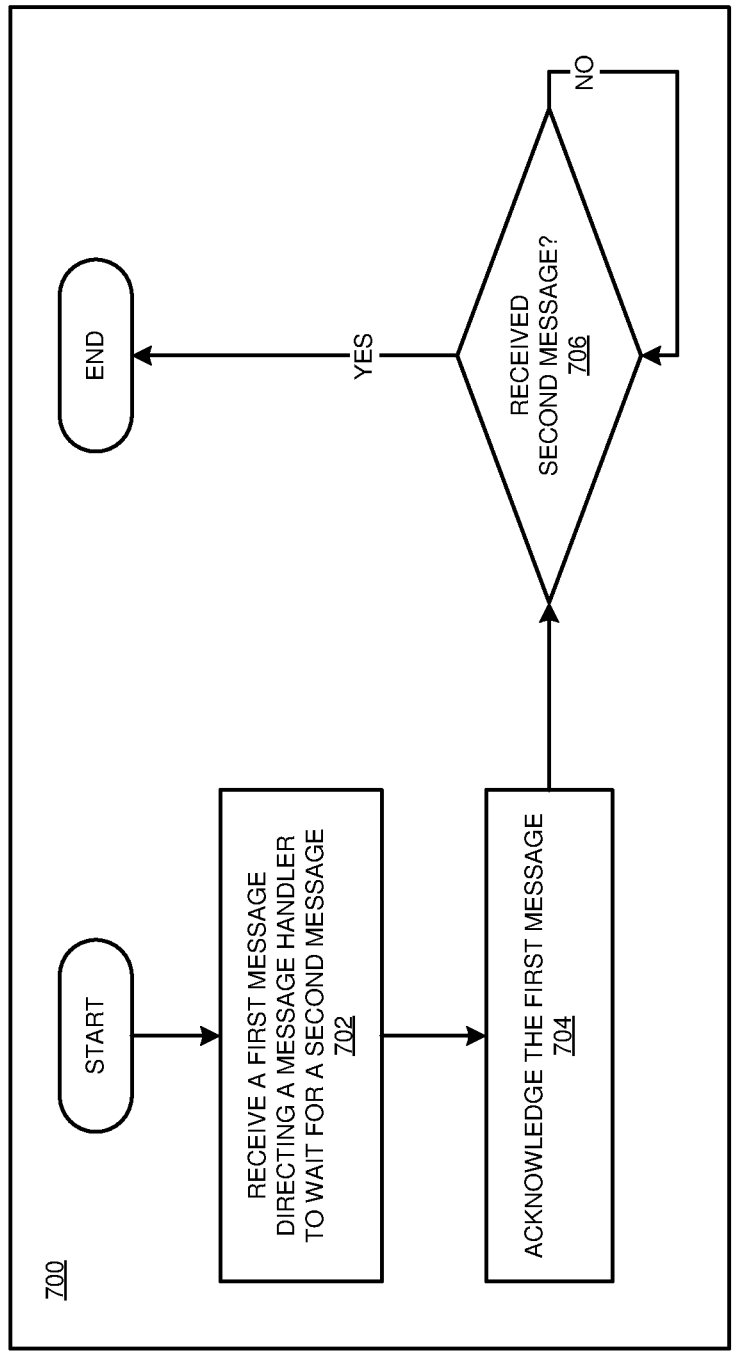
FIG. 7 depicts a flowchart of an example process for operating system code patching during live migration in accordance with an illustrative embodiment.

With reference to FIG. 7, this figure depicts a flowchart of an example process for operating system code patching during live migration in accordance with an illustrative embodiment. Process 700 can be implemented in message handler 530 executing in processor 504 in FIG. 5.

In block 702, the process receives a first message directing a message handler to wait for a second message. In block 704, the process acknowledges the first message. In block 706, the process waits until receiving a second message. Then ("YES" path of block 706) the process ends.

Thus, a computer implemented method, system or apparatus, and computer program product are provided in the illustrative embodiments for operating system code patching during live migration and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
   detecting, for a process of an operating system, that a live migration has occurred, the detecting performed by detecting a change in a processor version of a computer system on which the process executes;

broadcasting, to a set of processors subsequent to the detecting, a first message, the first message causing each processor in the set of processors to enter a waiting state; and modifying, while each of the set of processors is in the waiting state, a portion of a set of program instructions of the operating system.

2. The computer-implemented method of claim 1, wherein the waiting state comprises a state in which a processor in the set of processors does not execute user processes.

3. The computer-implemented method of claim 1, wherein the waiting state comprises a state in which a processor in the set of processors executes a message handler process until receiving a second message, the message handler process comprising a kernel process of the operating system.

4. The computer-implemented method of claim 1, further comprising:

receiving, from the set of processors, an acknowledgement of the first message, the acknowledgement confirming that a processor in the set of processors is in the waiting state.

5. The computer-implemented method of claim 1, wherein the modifying adjusts the portion to account for the change in the processor version.

6. The computer-implemented method of claim 1, wherein the change in the processor version comprises a change in a characteristic of a processor register, the processor register storing a value corresponding to an elapsed processing time of a thread, and the modifying adjusts the portion to implement the change in the processor register by adjusting a scaling factor corresponding to the value.

7. The computer-implemented method of claim 1, further comprising:

broadcasting, to the set of processors subsequent to the modifying, a second message, the second message causing the set of processors to exit the waiting state.

8. A computer usable program product comprising one or more computer-readable storage devices, and program instructions stored on at least one of the one or more storage devices, the stored program instructions comprising:

program instructions to detect, for a process of an operating system, that a live migration has occurred, the detecting performed by detecting a change in a processor version of a computer system on which the process executes;

program instructions to broadcast, to a set of processors subsequent to the detecting, a first message, the first message causing each processor in the set of processors to enter a waiting state; and program instructions to modify, while each of the set of processors is in the waiting state, a portion of a set of program instructions of the operating system.

9. The computer usable program product of claim 8, wherein the waiting state comprises a state in which a processor in the set of processors does not execute user processes.

10. The computer usable program product of claim 8, wherein the waiting state comprises a state in which a processor in the set of processors executes a message handler process until receiving a second message, the message handler process comprising a kernel process of the operating system.

11. The computer usable program product of claim 8, further comprising:

program instructions to receive, from the set of processors, an acknowledgement of the first message, the acknowledgement confirming that a processor in the set of processors is in the waiting state.

12. The computer usable program product of claim 8, wherein the modifying adjusts the portion to account for the change in the processor version.

13. The computer usable program product of claim 8, wherein the change in the processor version comprises a change in a characteristic of a processor register, the processor register storing a value corresponding to an elapsed processing time of a thread, and the modifying adjusts the portion to implement the change in the processor register by adjusting a scaling factor corresponding to the value.

14. The computer usable program product of claim 8, further comprising:

program instructions to broadcast to the set of processors subsequent to the modifying, a second message, the second message causing the set of processors to exit the waiting state.

15. The computer usable program product of claim 8, wherein the stored program instructions are stored in the at least one of the one or more storage devices of a local data processing system, and wherein the stored program instructions are transferred over a network from a remote data processing system.

16. The computer usable program product of claim 8, wherein the stored program instructions are stored in the at least one of the one or more storage devices of a server data processing system, and wherein the stored program instructions are downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect, for a process of an operating system, that a live migration has occurred, the detecting performed by detecting a change in a processor version of a computer system on which the process executes;

program instructions to broadcast, to a set of processors subsequent to the detecting, a first message, the first message causing each processor in the set of processors to enter a waiting state; and program instructions to modify, while each of the set of processors is in the waiting state, a portion of a set of program instructions of the operating system.

18. The computer system of claim 17, wherein the waiting state comprises a state in which a processor in the set of processors does not execute user processes.

19. The computer system of claim 17, wherein the waiting state comprises a state in which a processor in the set of processors executes a message handler process until receiving a second message, the message handler process comprising a kernel process of the operating system.

20. The computer system of claim 17, further comprising:

program instructions to receive, from the set of processors, an acknowledgement of the first message, the acknowledgement confirming that a processor in the set of processors is in the waiting state.

\* \* \* \* \*